United States Patent [19]

Clarke

[11] 4,265,348
[45] May 5, 1981

[54] ELECTRO-VISCOUS FAN CLUTCH WITH SNAP ACTION SPRING VALVE ELEMENT FOR CONTROL OF FLUID GATE

[75] Inventor: Stephen E. Clarke, Dayton, Ohio

[73] Assignee: General Motors Corporation, Detroit, Mich.

[21] Appl. No.: 88,475

[22] Filed: Oct. 26, 1979

[51] Int. Cl.³ ............................................. F16D 35/00
[52] U.S. Cl. ................................. 192/58 B; 192/82 T
[58] Field of Search ........................... 192/58 B, 82 T; 251/DIG. 3, 131

[56] References Cited

U.S. PATENT DOCUMENTS

| | | | |
|---|---|---|---|
| 3,179,221 | 4/1965 | Weir | 192/58 B |
| 3,209,993 | 10/1965 | Seifert | 192/82 T |
| 3,587,801 | 6/1971 | Riner | 192/58 B |
| 3,739,891 | 6/1973 | La Flame | 192/82 T X |
| 3,983,981 | 10/1976 | Snodgrass et al. | 192/58 B |
| 4,056,178 | 11/1977 | Detty | 192/58 B |

FOREIGN PATENT DOCUMENTS 2804859  8/1979  Fed. Rep. of Germany ......... 192/82 T

*Primary Examiner*—Rodney H. Bonck
*Attorney, Agent, or Firm*—Charles R. White

[57] ABSTRACT

An electro-viscous hydraulic clutch for a fan clutch in which a control arm for controlling the fluid to a shear zone of the fluid clutch is incorporated in an over-center spring which hinges on the pump plate for snap action operation. The control arm is actuated by an electromagnetic device which is mounted either on a fan clutch cover plate or on the fan clutch shaft pole. This invention features low actuating force, snap action control arm operation and integral spring return. The spring return disengages the clutch when the solenoid or coil power is removed.

2 Claims, 5 Drawing Figures

ELECTRO-VISCOUS FAN CLUTCH WITH SNAP ACTION SPRING VALVE ELEMENT FOR CONTROL OF FLUID GATE

This invention relates to engine cooling fan clutches and more particularly to an electro-viscous fan clutch having a spring valve element providing snap action control of fluid flowing through a gate in a pump plate into a viscous clutch shear zone to reduce hysteresis in clutch operation.

Prior to the present invention, various electromagnetic-viscous clutch designs for engine cooling fans have been made to improve engine cooling fan operation. In one design, a fixed electromagnet is mounted outboard of the viscous clutch to move a valve member axially to control the supply of viscous fluid in a shear zone for the viscous operation of the clutch. In another design, a coil is disposed inboard of the viscous clutch and within a pulley housing so that the clutch input shaft acts as a pole piece of an electromagnet to move a valve arm to control viscous operation of the clutch. In both designs, hysteresis appears in clutch operation partially from mechanical frictional resistance and delay in valve operation. In these prior designs, auxiliary return springs are employed to move the valve member to an open position once the electromagnetic devices are deenergized. The return force of these springs must be overcome by the electromagnetic coil and considerable electrical energy is consumed for this purpose. Furthermore, the retarding action of this spring detracts from quick valve operation.

In contrast to the prior art, this invention provides an electro-viscous fan clutch including a new and improved spring valve element that provides the spring force for returning the valve member to a predetermined position for controlling clutch operation to thereby eliminate auxiliary spring. In addition to the elimination of auxiliary spring, the spring valve element of this invention utilizes bowed control arms to hold a member in tension so that the fluid gate or other inlet port is normally blocked for clutch disengagement. On solenoid energization, the tension member is snapped to an open position once moved past an over-center position with the bowed control arms being deflected from an outwardly bowed position. This invention incorporates a new and improved over-the-center spring element with at least one bowed control arm which is operatively connected to a tension member so that over-center displacement of the tension member can rapidly move a head portion of the spring element into blocking or unblocking positions with respect to a fluid gate. In this invention a new and improved fluid porting gate is utilized which incorporates a 'T' slot in which the stem of the 'T' leads from a central opening in the pump plate so that the valve element can be readily peeled from the surface of the pump plate to quickly overcome surface tension and to readily break the sealing effect which occurs between the pump plate and the valve member. With the new and improved spring valve element of this invention providing force multiplying action, hysteresis in clutch operation is reduced. Furthermore, the electromagnetic device of this invention provides an option on direction of actuation so that new and improved clutch control is provided.

It is a feature, object and advantage of this invention to provide a new and improved electro-viscous fluid clutch for engine cooling fans which incorporate a toggling control arm providing a positive snap action with low actuating force for controlling the fluid passage from a reservoir into the fluid shear zone of the clutch.

It is another feature, object and advantage of this invention to provide a new and improved electromagnetic viscous clutch for engine cooling fans in which fluid from a reservoir is supplied into a viscous clutch through a slotted fluid gate incorporated in the pump plate so that the control valve mechanism for this gate can be easily lifted from a pump plate to eliminate control arm sticking.

Another feature, object and advantage of this invention is to provide an electro-viscous fluid fan drive clutch having a new and improved spring valve element with a control arm for controlling a fluid gate in a pump plate which element is stable in the closed position once it is secured in place.

Another feature, object and advantage of this invention is to provide a new and improved over-center toggle spring control arm for a fluid clutch in which return springs are eliminated since the control arm provides sufficient spring force to return the solenoid core to the closed position when the power controlling the arm is removed.

In one preferred embodiment of this invention, the control arm is incorporated in a spring valve element actuated by solenoid with the core mounted on a fan clutch cover plate. The control arm is an over-center spring which hinges on the pump plate. In this design the spring is electrically controlled to effect engagement and disengagement of the fluid drive.

In a second embodiment of the invention, a non-rotating coil is mounted on a fan clutch shaft to magnetize the shaft and pull a pole piece into contact with the end of the shaft causing the center of the control arm to move and snap the arm into the open position. The coil is preferably mounted on the shaft on a bearing and does not rotate being restrained by a cable or bracket tied to a fixed structure nearby.

These and other features, objects and advantages of this invention will be more apparent from the following detailed description and drawing in which.

Figure 1:
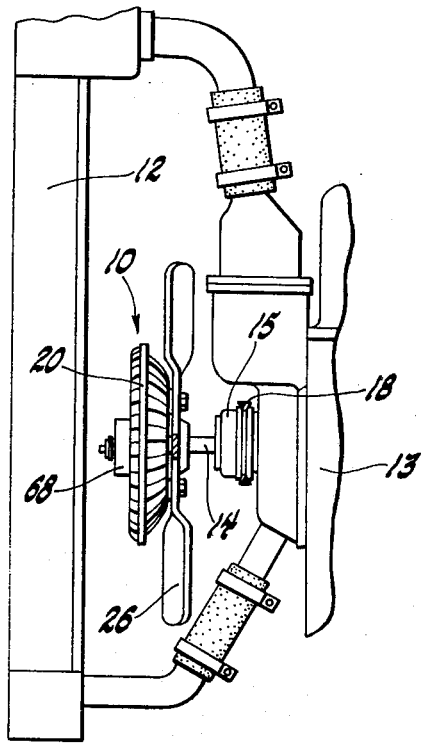
FIG. 1 is a side elevational view of a radiator and an engine having an electromagnetic viscous fluid clutch and associated cooling fan.
Figure 2:
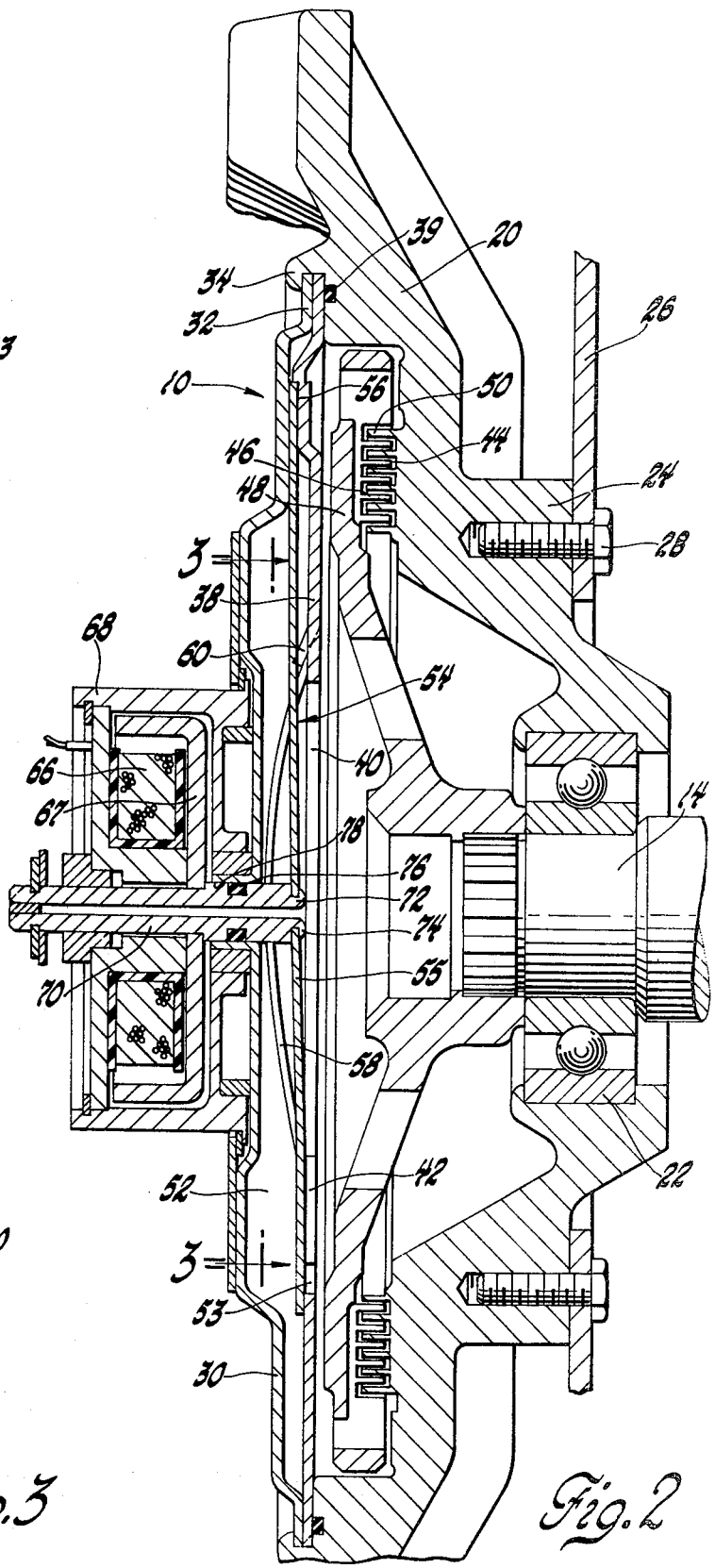
FIG. 2 is an enlarged fragmentary cross sectional view of the electromagnetic viscous fluid clutch of FIG. 1 embodying this invention.

Turning now in greater detail to the drawing, there is shown in FIG. 1 a multibladed fan and clutch assembly 10 for drawing cooling air through the core of a vehicle radiator 12 through which cooling fluid from vehicle engine 13 is circulated. This assembly 10 is mounted on the outboard end of a rotatably dirven shaft 14 whose inner end terminates in a flange secured to a water pump pulley 15. The pulley 15 and shaft 14 attached thereto are rotatably driven by engine 13 through a drive belt 18. As shown in FIG. 2, the fan and clutch assembly comprises an annular dish-like main body 20 centrally mounted for rotation on shaft 14 by bearing 22. The main body 20 is formed with a plurality of radially extending bosses 24 to which a bladed fan 26 is attached by threaded fasteners 28. A cover 30 is mounted to the front of the main body 20 and cooperates therewith to form a chamber within which are housed the interior components of the electromagnetic-viscous clutch of this invention. These components are controlled to drivingly connect and disconnect the fan with respect to the shaft 14.

The cover 30 is a thin-walled and dished member which has a radial flange 32 peripherally secured to the main body by the annular upset or spun over portion 34 of the main body 20. Disposed immediately behind cover 30 is a disc-like annular pump plate 38 whose diameter is equal to that of the cover 30 and is drivingly secured to the main body 20, being trapped behind cover flange 32 and cooperating upset portion 34. Annular seal 39 interposed between the pump plate and the main body prevents fluid leakage outwardly from the assembly 10.

The pump plate 38 has a centralized annular opening 40 from which there radially extends a 'T' shaped gate or slot 42 for conducting a flow of fluid into an annular fluid shear zone 44 formed by the space between the inner leaved annular ridges 46 of a rotating clutch plate 48 and corresponding annular ridges 50 formed on the inner surface of the main body 20. Fluid sheared in this zone transmits input torque from the clutch plate, which is centrally splined to shaft 14, to main body 20 to provide the hydraulic drive of body 20 and the bladed fan attached thereto.

Figure 3:
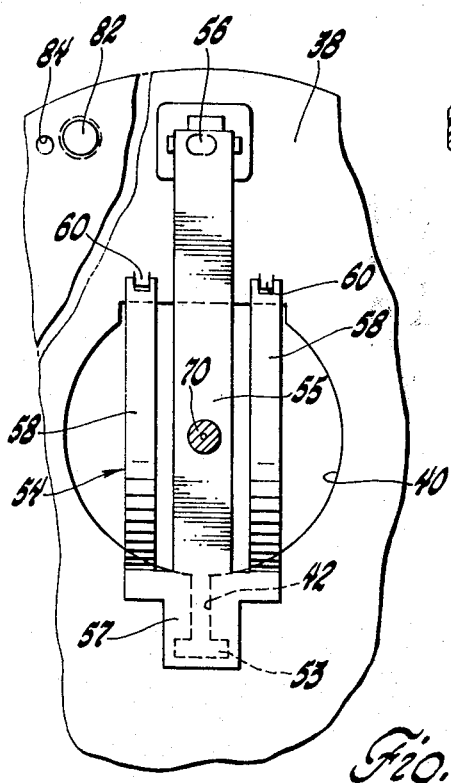
FIG. 3 is a plan view taken along lines 3—3 of FIG. 2 as viewed in the direction of the indicator arrows.

An annular reservoir 52 formed between the cover 30 and the pump plate 38 contains a quantity of viscous silicone clutching fluid which can be fed into the shear zone 44 primarily through the outer or cross segment 53 of the 'T' shaped gate 42 into the shear zone of the clutch. The gate is controlled by a spring valve element 54 of thin spring metal. The spring valve element has a rectilinear central tension member 55 having one end spot welded at 56 to the pump plate 38. As shown in FIG. 3, the tension member 55 extends from weld 56 diametrically across the annular opening 40 and terminates in a head and shoulder portion 57. The head and shoulder portion of valve element 54 is biased against the pump plate 38 by a pair of outwardly sprung or toggling control arms 58 to close the 'T' shaped gate 42 so that viscous fluid will not be fed in quantity to the shear zone. The control arms are bow springs extending from the head and shoulder portion along the opposite side of the tension member. The ends of these bowed control arms are grounded to the pump plate 38 by tabs 60 struck outwardly from the pump plate. The control arms 58 provide a tension load on the tension member 55 and urge the head and shoulder portion into engagement with the pump plate whereby the 'T' slot is hydraulically blocked.

With this invention, electromagnetic means are employed to operate the spring valve element for control of the gate 42 and the supply of fluid to the viscous clutch. To this end, an electromagnetic coil 66 is secured by bracket 67 within a stationary annular housing 68 which in turn is mounted on the cover plate 30 by suitable bearing means as in copending application, Ser. No. 912,426, filed June 5, 1978 for Electrically Actuated Viscous Clutch herein incorporated by reference, and which is assigned to the assignee of this application. The coil has an elongated cylindrical core 70 extending therethrough which is mounted for axial shifting movement therein. The inner end 72 of the core 70 is of a reduced diameter and extends through an opening in the tension member 55. The end of core 70 is spun over at 74 so that the central portion of the tension member is secured to the core. Annular seals 76 carried by a groove in core 70 engage the walls of a core opening 78 centrally formed in the cover plate to prevent the escape of fluid from the viscous clutch. The coil is connected by conventional circuitry to a temperature responsive switching mechanism, not shown, operatively mounted within the radiator so that coolant temperature signals can be directly utilized to effect energization or deenergization of the coil for fan clutch engagement or disengagement for regulating the temperature of the engine coolant.

In this invention the pump plate is formed with a cylindrical projection forming a pumping element 82 and cooperating discharge orifice 84 disposed adjacent the periphery of the plate such as disclosed in the above identified copending application, Ser. No. 912,426.

In operation and assuming that the 'T' shaped gate is closed by the spring valve element, the pumping element will pump the fluid from the shear area so that there will be minimized hydraulic drive of the housing and fan by the clutch plate. As soon as the temperature responsive switch is closed by increase in engine coolant temperature, the coil 66 will be energized to effect the axial withdrawal of the core 70. As the core moves the tension member outwardly and passed the center of action of the spring valve element, the head and shoulder portion will be quickly snapped and pealed away from the 'T' slot gate so that the viscous fluid will flow in quantity into the shear area of the clutch. When this occurs, there will be a pickup in speed of the fan clutch which may rapidly increase from an unclutched speed of 1,000 RPM to a clutched speed of 2,000 RPM without much time lag. As the engine coolant temperature decreases to a predetermined temperature, the temperature responsive switch will open and the solenoid will be deenergized. The spring control arms 58 will provide the spring force to quickly return the spring valve element to the closed position in which the head and shoulder portion 52 closes the gate 42. Under these conditions the pumping element 82 will again pump fluid from the shear area so that the fluid drive is reduced to the point where the fan rotates at a very low speed without substantial absorption of vehicle engine output.

Figure 4:
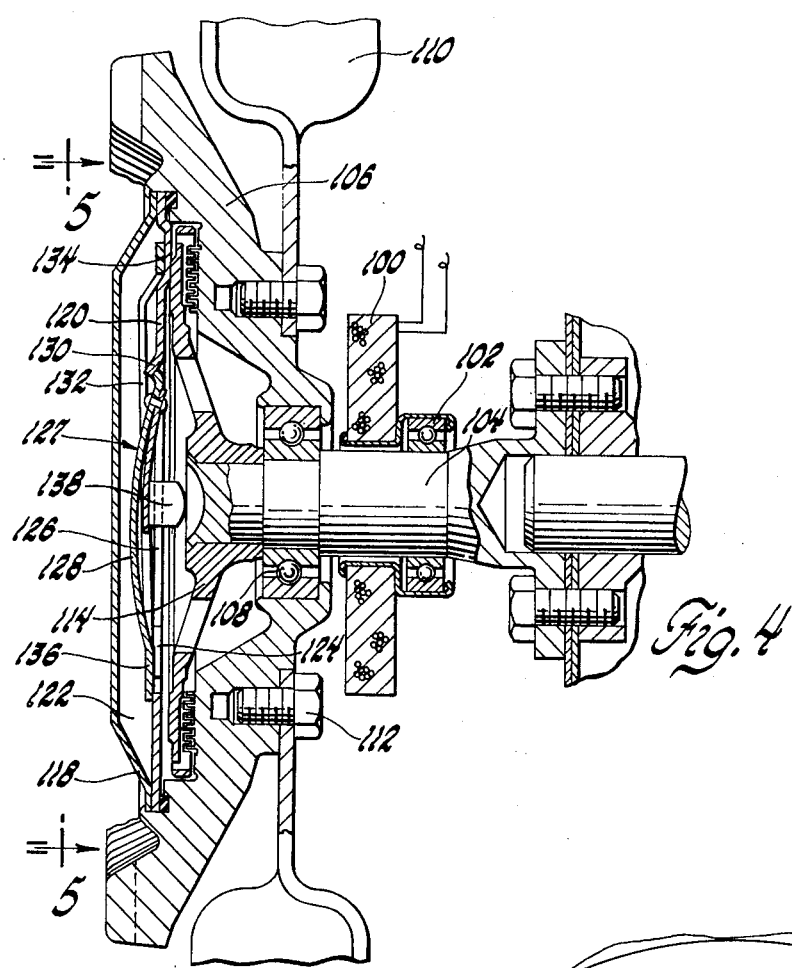
FIG. 4 is a cross sectional view similar to that of FIG. 2 illustrating a second embodiment of this invention.
Figure 5:
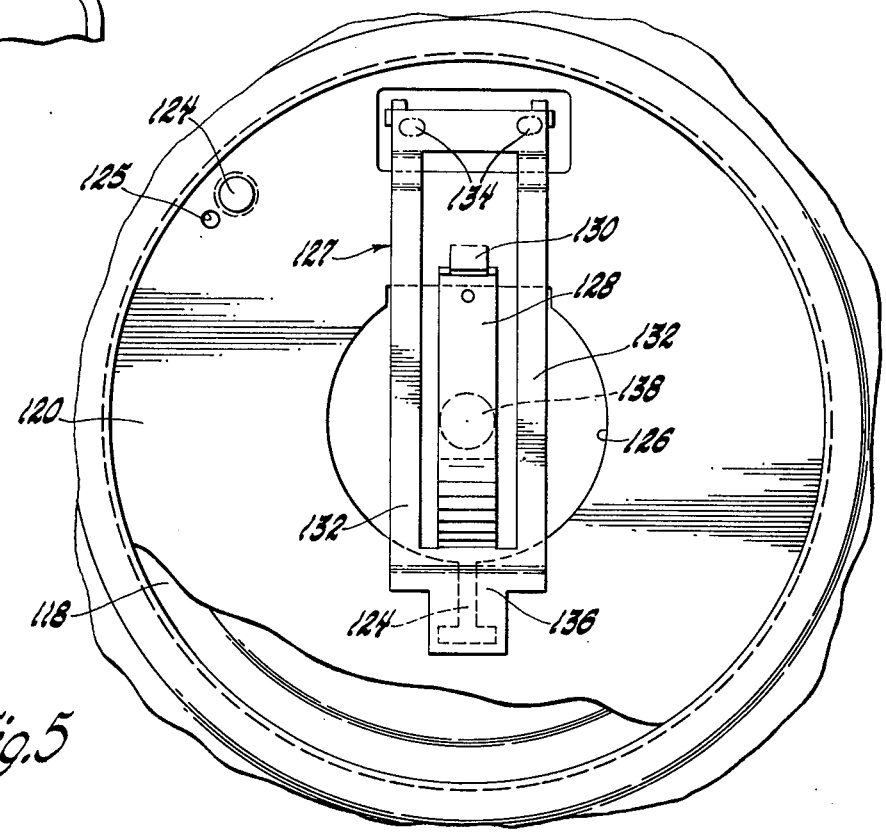
FIG. 5 is a plan view taken along lines 5—5 of FIG. 4 as viewed in the direction of the indicator arrows.

A second embodiment of the invention illustrated by FIGS. 4 and 5 incorporates a stationary coil 100 which is mounted by a bearing 102 on a rotatably driven shaft 104. A fan clutch housing 106 corresponding to housing 20 of the first embodiment is supported for rotation on shaft 104 by a bearing 108. This housing has a fan blade assembly 110 secured thereto by threaded fasteners 112. Disposed within the housing 106 is a clutch plate 114 which is secured to the drive shaft 104 for rotation therewith. The clutch plate and housing have interleaved concentric ridges to form the viscous shear area as described in connection with the first embodiment. A solid disc-like cover plate 118 is secured to the housing 106 enclosing the clutch plate and a disc-like pump plate 120 which corresponds to that of the first embodiment. A predetermined quantity of viscous fluid is disposed in the reservoir area 122 between the cover plate and the pump plate for operation of the viscous clutch. The pump plate has a 'T' shaped fluid gate 124 which extends radially from the central annular opening 126 of the pump plate as in the first embodiment. Fluid from the reservoir admitted through gate 124 can enter the shear zone for the fluid drive of housing 106 and the blade assembly 110 as previously described. The fluid pumping construction of the pump plate is the same as in the first embodiment and includes the cylindrical pump element 124 and discharge orifice 125 which pump fluid from the shear zone back into the reservoir. Disposed outboard of the pump plate is a multiarmed spring valve element 127 which includes an outwardly bowed control arm 128 which is grounded on a tab 130 struck outwardly from the pump plate. The spring valve element 127 further incorporates two tension arms 132 which are spot welded to the pump plate at 134 as shown in the drawing. With the control arm sprung outwardly, the head and shoulder portion 136 of this spring valve element is based against the face of the pump plate to close the gate 124 so that reservoir fluid cannot flow from the reservoir into the viscous shear zone. The control arm 128 has an inwardly extending pole piece 138 which is spaced from the end of the shaft 104 by a predetermined distance as illustrated in FIG. 4.

The coil 100 is operatively connected by suitable power leads to a temperature responsive control switching mechanism located within the cooling fluid of the vehicle radiator as described in connection with the first embodiment. When the cooling fluid reaches a predetermined temperature level in which the increased cooling is needed, the coil will be energized so that the shaft 104 acts as a pole of an electromagnet. The magnetic forces generated on coil energization attract the pole piece 138 to pull the control arm 128 downwardly. As soon as the control arm reaches its over-center position, it snaps inwardly so that the head and shoulder portion of the spring valve element rapidly lifts from the 'T' shaped gate and viscous fluid can enter into the shear zone for the fluid drive of the fan.

With the fan being driven, cooling air will be pulled in increased quantity through the radiator so that the coolant temperature will drop. After sufficient drop in coolant temperature, the switch opens to effect deenergization of the coil so that the spring snaps back to the FIG. 4 position in which the gate 124 is again closed and the fluid shear zone is exhausted of fluid so that there is little or no viscous drive of the fan blading.

In both of the embodiments of the invention, the spring valve element provides an over-the-center snap action which is more responsive to the input signals so that hysterisis in clutch operation is minimized. Additionally, with this construction conventional return springs for moving the electromagnetic pole members are eliminated so that complexity of construction is reduced. With this construction, less energy is required to operate the valving since it can be actuated with a low energy coil.

While a preferred embodiment of the invention has been shown and described to illustrate the invention, other modifications will become apparent to those skilled in the art. Accordingly, the scope of this invention is set forth in the following claims.

The embodiments of the invention in which an exclusive property or privilege is claimed are defined as follows:

1. A fan for inducing air flow through a radiator in which engine coolant is circulated comprising a shaft adapted to be rotatably driven, first rotatable clutch means operatively connected to said shaft for rotation therewith, a housing for said first clutch means rotatably supported by said shaft, said housing having second clutch means formed thereon spaced from said first clutch means to provide a fluid shear zone therebetween, fan means secured to said housing and extending radially therefrom, a cover plate attached to said housing to form a chamber therewith, a pump plate secured to said housing between said cover plate and said first clutch means to form a fluid reservoir, said pump plate means having a fluid gate therein for conducting fluid from said reservoir into said shear zone, over-center spring valve means mounted on said pump plate means and movable between opened and closed position with respect to said fluid gate for controlling the flow of fluid through said gate from said reservoir into said shear zone to thereby control the transmission of torque through said clutch, and electromagnetic actuator means energizable to move said spring valve means to said open position for the viscous drive of said clutch, and said spring valve means having bowed control arms means integral therewith to return said spring valve means to a closed position when the electromagnetic actuator means is deenergized.

2. A fan for inducing air flow through a radiator in which engine coolant is circulated comprising a shaft adapted to be rotatably driven, first rotatable clutch means operatively connected to said shaft for rotation therewith, a housing for said first clutch means rotatably supported by said shaft, said housing having second clutch means formed thereon spaced from said first clutch means to provide a fluid shear zone therebetween, fan means secured to said housing and extending radially therefrom, a cover plate attached to said housing to form a chamber therewith, a pump plate secured to said housing between said cover plate and said first clutch means to form a fluid reservoir, said pump plate means having a central opening and an elongated fluid gate therein leading from said central opening for conducting fluid from said reservoir into said shear zone, over-center spring valve means mounted on said pump plate means and movable between opened and closed position with respect to said fluid gate for controlling the flow of fluid through said gate from said reservoir into said shear zone to thereby control the transmission of torque through said clutch, and electromagnetic actuator means energizable to peal said spring valve means from said fluid gate for the viscous drive of said clutch, and said spring valve means having bowed control arm means integral therewith to return said spring valve means to a closed position when the electromagnetic actuator means is deenergized.

* * * * *